US009432073B2

(12) United States Patent
Igarashi

(10) Patent No.: US 9,432,073 B2
(45) Date of Patent: Aug. 30, 2016

(54) HOUSING-PROTECTING CASE FOR PORTABLE ELECTRONIC DEVICE

(71) Applicant: Power Support Co., Ltd., Tokyo (JP)

(72) Inventor: Katsushi Igarashi, Tokyo (JP)

(73) Assignee: POWER SUPPORT CO., LTD., Tokyo (JP)

(*) Notice: Subject to any disclaimer, the term of this patent is extended or adjusted under 35 U.S.C. 154(b) by 0 days.

(21) Appl. No.: 14/441,010

(22) PCT Filed: Nov. 11, 2013

(86) PCT No.: PCT/JP2013/080449
§ 371 (c)(1),
(2) Date: May 6, 2015

(87) PCT Pub. No.: WO2014/077217
PCT Pub. Date: May 22, 2014

(65) Prior Publication Data
US 2015/0303967 A1  Oct. 22, 2015

(30) Foreign Application Priority Data
Nov. 19, 2012  (JP) .................................. 2012-252985

(51) Int. Cl.
H04B 1/3888  (2015.01)
H04M 1/04  (2006.01)
H04M 1/02  (2006.01)
A45C 11/00  (2006.01)

(52) U.S. Cl.
CPC ......... *H04B 1/3888* (2013.01); *H04M 1/0202* (2013.01); *H04M 1/04* (2013.01); *A45C 2011/002* (2013.01); *G06F 2200/1633* (2013.01)

(58) Field of Classification Search
CPC .. H04M 1/04; H04M 1/0202; H04B 1/3888; A45C 2011/002; G06F 2200/1633
USPC ....................................... 455/575.8
See application file for complete search history.

(56) References Cited

FOREIGN PATENT DOCUMENTS

JP  2011-234182 A  11/2011

OTHER PUBLICATIONS

"Power Support, Dai 5 Sedai iPod touch-yo 'Air Jacket' 'Silicone Jacket' o Hatsubai", [online], Touch Lab, Nov. 17, 2012.*

(Continued)

*Primary Examiner* — Raymond Dean
(74) *Attorney, Agent, or Firm* — Maier & Maier, PLLC

(57) ABSTRACT

Provided is a housing protection case that can prevent a strap from being detached from a mobile electronic device. A housing protection case for covering at least a part of back and side surfaces of a mobile electronic device having a strap attachment part protruding from the back surface includes a main body covering at least a part of the back and side surfaces of the mobile electronic device, a strap attachment part cover protruding from a back surface of the main body and covering the strap attachment part, and a strap draw-out part disposed in a position adjacent to the strap attachment part cover and allowing a strap attached to the strap attachment part to pass therethrough.

6 Claims, 7 Drawing Sheets

(56) References Cited

OTHER PUBLICATIONS

International Search Report dated Jan. 7, 2014 from corresponding International Patent Application No. PCT/JP2013/080449; 1 pg.

"Power Support, Dai 5 Sedai iPod touch-yo "Air Jacket" 'Silicone Jacket' o Hatsubai", [online], Touch Lab, Nov. 17, 2012, [retrieval date Dec. 17, 2013], Internet ,<URL:http://touchlab.jp/2012/11/power-support-ipodtouch5th-cases/>.

* cited by examiner (a) PLAN VIEW OF REGION A (b) LINE B-B SECTIONAL VIEW

HOUSING-PROTECTING CASE FOR PORTABLE ELECTRONIC DEVICE

TECHNICAL FIELD

The present invention relates to a case for protecting the housing of a mobile electronic device.

BACKGROUND ART

A mobile electronic device is an electronic device which can be carried easily. Examples thereof include mobile phones, smartphones, and portable media players. One of the mobile electronic devices is the fifth-generation iPod Touch released by Apple Inc. on Sep. 12, 2012.

As shown in FIGS. 1(a) to 1(c), a pop-up strap attachment part 3 is disposed at a corner of the back surface of a mobile electronic device 1, which is the Apple iPod Touch. The strap attachment part 3 includes a base 3a vertically extending from the back surface of the mobile electronic device 1 and having a circular section and a circular diameter-expanded part 3b disposed at an end of the base 3a and having a larger radius than the base 3a (see FIG. 1(c)). A strap 5 having a ring at its front end is included with the mobile electronic device 1 and is called iPod Touch loop. By attaching the strap 5 to the strap attachment part 3, the mobile electronic device 1 can be prevented from falling unintentionally.

The ring of the strap 5 has a central base hole 5a and a narrow part 5b extending from the base hole 5a toward the front end. By inserting the diameter-expanded part 3b of the strap attachment part 3 into the base hole 5a of the strap 5 as shown in FIG. 1(a) and then sliding the strap 5 as shown in FIG. 1(b), the narrow part 5b of the strap 5 is slid onto the base 3a of the strap attachment part 3, so that the strap 5 is fixed to the strap attachment part 3.

SUMMARY OF INVENTION

Technical Problem

As seen above, the strap 5 can be attached easily. However, when the inventor actually carried, in a bag, the mobile electronic device 1 to which the strap 5 was attached, the inventor became aware that the strap 5 had been detached. The inventor then investigated the cause of the detachment and found that the cause was one of the following cases: a force was applied to the strap 5 in an unintentional direction in the bag and thus the strap 5 was slid so that the narrow part 5b thereof was detached from the base 3a of the strap attachment part 3; and as shown in FIG. 2, a force was applied to the strap 5 in a direction such that the strap 5 was torn off from the mobile electronic device 1 and thus the strap 5 was detached from the mobile electronic device 1.

Cases for protecting the housing of a mobile electronic device from damage are available from various vendors. Such housing protection cases include ones which have an aperture through a portion thereof corresponding to the strap attachment part so that a strap is attached thereto through the aperture, as well as ones which have no aperture through a portion thereof corresponding to the strap attachment part and thus do not allow a strap to be attached thereto.

The present invention has been made in view of the foregoing, and an object thereof is to provide a housing protection case that can prevent a strap from being detached from a mobile electronic device.

Solution to Problem

The present invention provides a housing protection case for covering at least a part of back and side surfaces of a mobile electronic device having a strap attachment part protruding from the back surface. The case includes a main body covering at least a part of the back and side surfaces of the mobile electronic device, a strap attachment part cover protruding from a back surface of the main body and covering the strap attachment part, and a strap draw-out part disposed in a position adjacent to the strap attachment part cover and allowing a strap attached to the strap attachment part to pass therethrough.

Unintentional detachment of a strap does not occur so often. Further, even when a strap is detached, it can be attached again. Accordingly, the vendors have not recognized the detachment of a strap as a problem. However, the inventor found that some mobile electronic device users were keenly aware of the completeness of products and that such users recognized unintentional detachment of a strap as a grave problem which reduced their satisfaction with the product, even if such an event did not occur so often. The housing protection case of the present invention satisfies a users' potential request that the vendors have not been aware of at all. If this housing protection case is used, the strap attachment part cover thereof prevents a strap from moving in a direction such that the strap is torn off from the mobile electronic device. Thus, the strap detachment problem no longer occurs, which can improve user satisfaction.

BRIEF DESCRIPTION OF THE DRAWINGS

FIGS. 5(a) to 5(g) are diagrams showing the structure of the housing protection case, in which FIG. 5(a) is a front view, FIG. 5(b) is a right side view, FIG. 5(c) is a left side view, FIG. 5(d) is a back view, FIG. 5(e) is a plan view, FIG. 5(f) is a bottom view, and FIG. 5(g) is a sectional end surface view taken along line A-A'.

DESCRIPTION OF EMBODIMENTS

Now, an embodiment of the present invention will be described with reference to the drawings. However, the embodiment below is illustrative only and does not limit the scope of the present invention.

Figure 3:
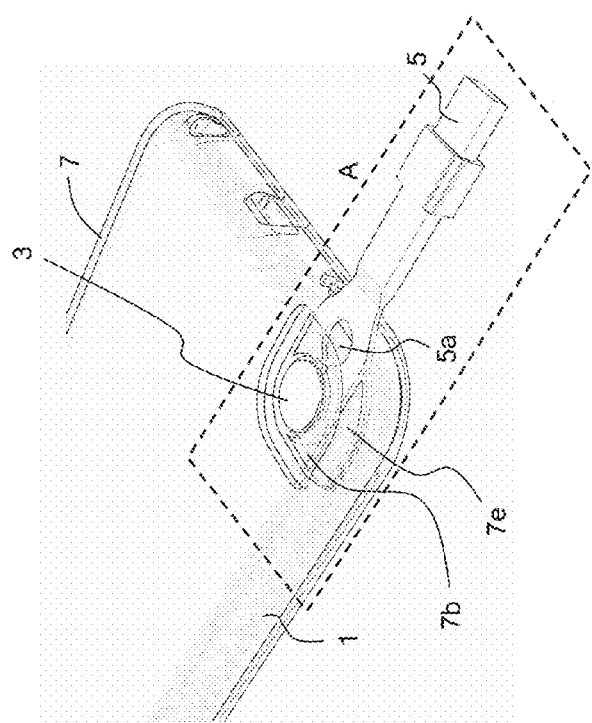
FIG. 3 is a perspective view showing a state in which a strap and a housing protection case of an embodiment of the present invention are attached to a mobile electronic device.
Figure 4:
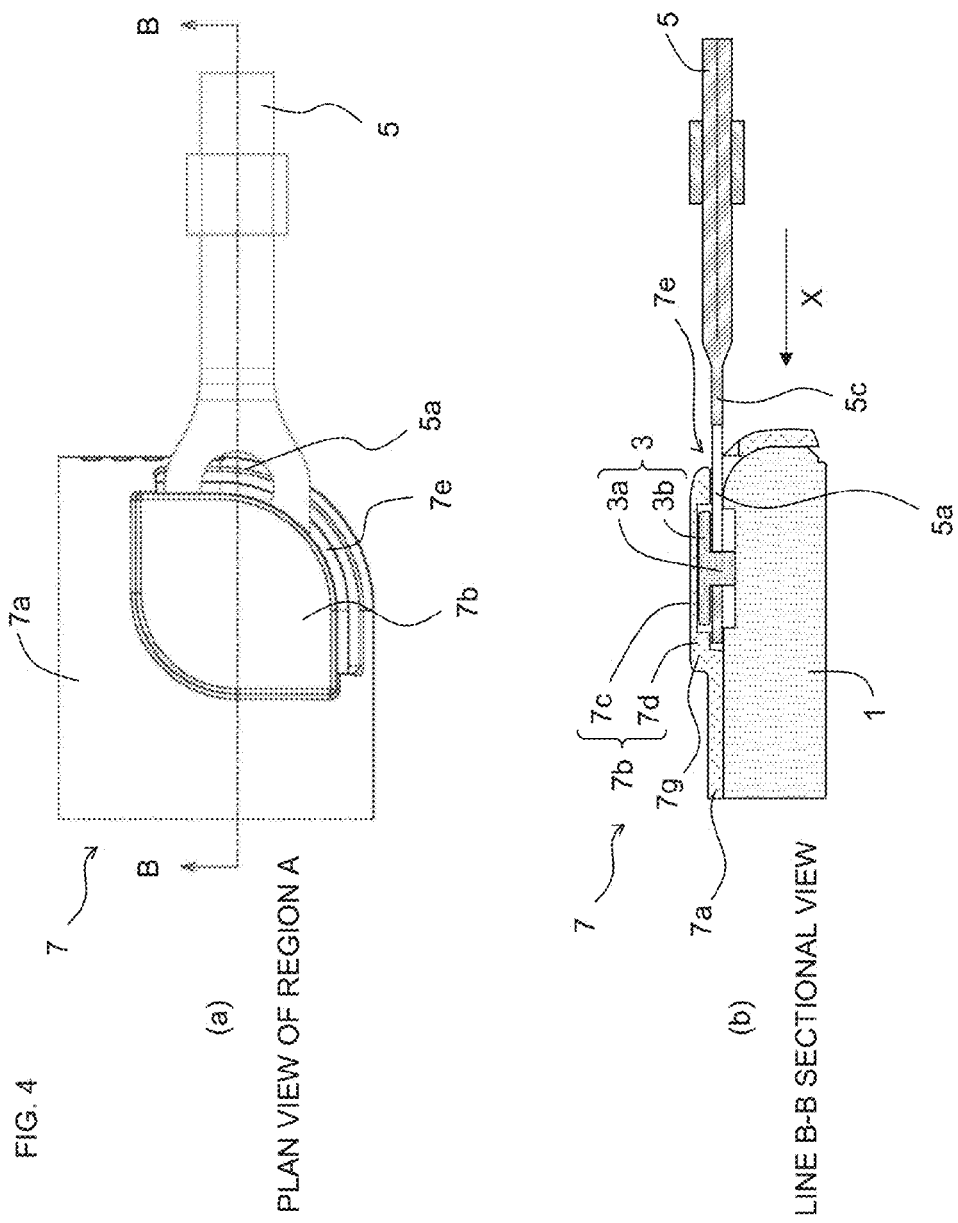
FIG. 4(a) is a plan view of a region A in FIG. 3.
FIG. 4(b) is a sectional view taken along line B-B of FIG. 4(a).
Figure 5:
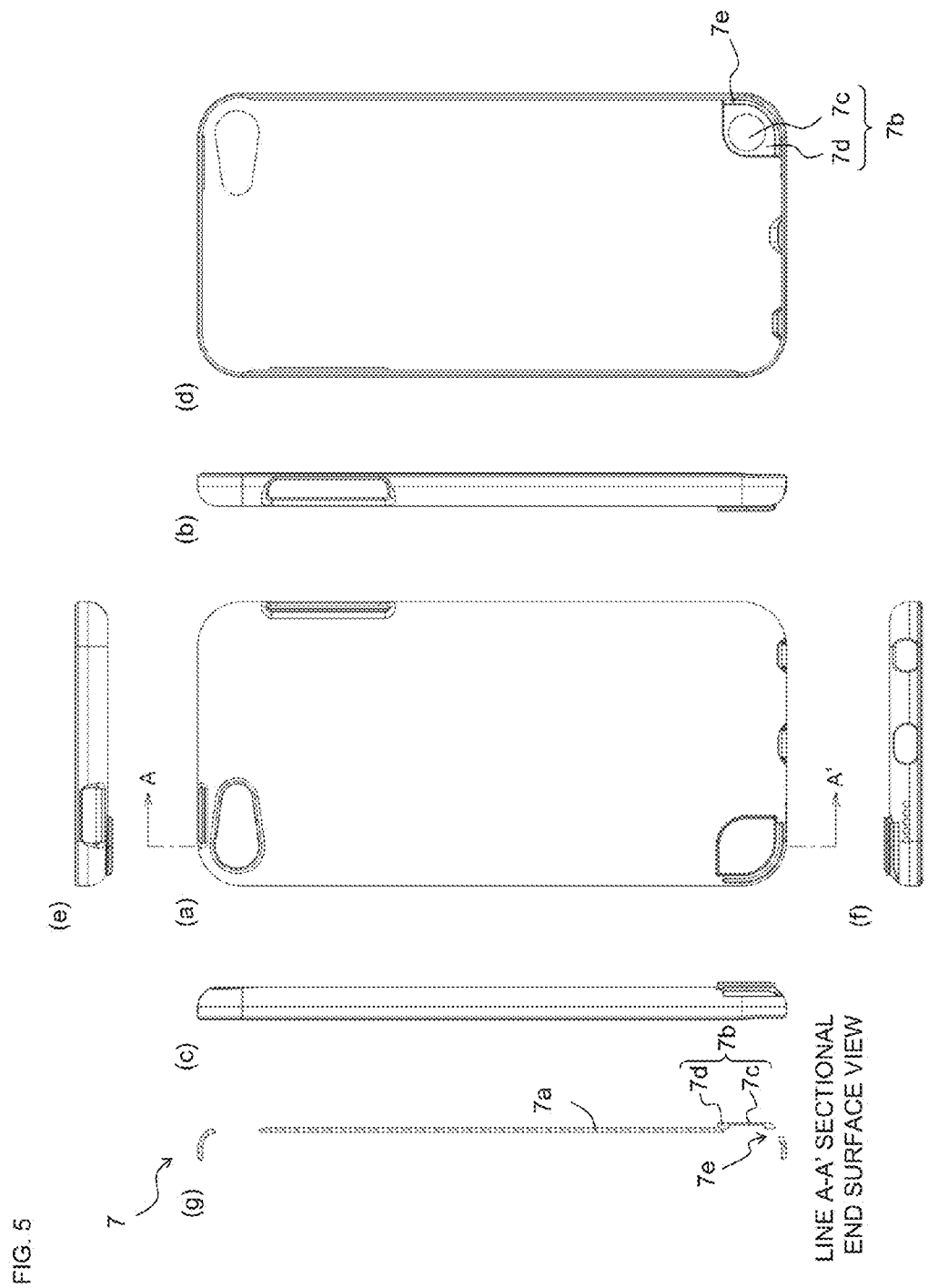

FIG. 3 shows a state in which a strap (e.g., iPod Touch loop) 5 and a housing protection case 7 of the embodiment of the present invention are attached to a mobile electronic device (e.g., the fifth-generation iPod Touch) 1. FIG. 4(a) is a plan view of a region A in FIG. 3, and FIG. 4(b) is a sectional view taken along line B-B of FIG. 4(a). FIGS. 5(a) to 5(g) include six surface views and end surface views showing the detailed structure of the housing protection case 7.

As shown in FIG. 3, the housing protection case 7 is attached to the mobile electronic device 1 having the strap 5 attached to a strap attachment part 3 thereof. The strap 5 is drawn out of the housing protection case 7 through a strap draw-out part 7e.

Figure 1:
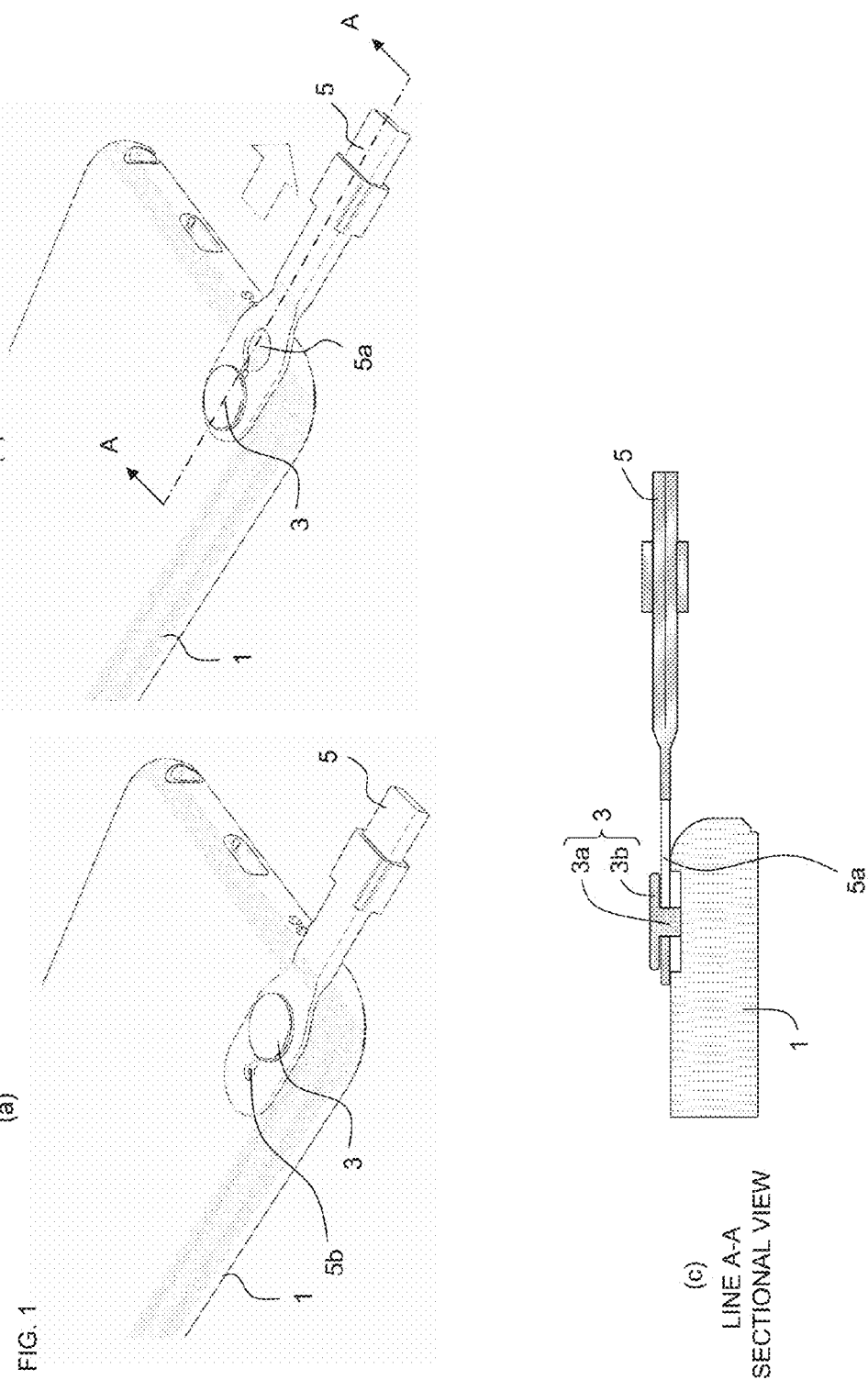
FIGS. 1(a) and 1(b) are perspective views showing a method for attaching a strap to a mobile electronic device.
FIG. 1(c) is a sectional view taken along line A-A of FIG. 1(b).

By inserting a diameter-expanded part 3b of the strap attachment part 3 into a base hole 5a of the strap 5 as shown in FIG. 1(a) and then sliding the strap 5 as shown in FIG. 1(b), a narrow part 5b of the strap 5 is slid onto a base 3a of the strap attachment part 3, so that the strap 5 is fixed to the strap attachment part 3. The fixed state is shown in FIG. 1(c).

The housing protection case 7 can be attached to the mobile electronic device 1 using elastic fit or the like. Prior to attaching the housing protection case 7 to the mobile electronic device 1, the free end of the strap 5 fixed to the strap attachment part 3 is passed through the strap draw-out part 7e and then the housing protection case 7 is attached to the mobile electronic device 1. The housing protection case 7 aims to protect the back and side surfaces of the mobile electronic device 1 from damage and to reduce the impact on the mobile electronic device 1. It covers at least a part of the back and side surfaces of the mobile electronic device 1. Preferably, the housing protection case 7 covers as wide a range of the mobile electronic device 1 as possible except for an aperture necessary for a camera, connector, microphone, speaker and the like of the mobile electronic device 1 to function and a notch necessary to attach the housing protection case 7. However, the housing protection case 7 need not necessarily cover the mobile electronic device 1 in its entirety and only has to cover it to the extent that the housing can be protected.

The housing protection case 7 includes a strap attachment part cover 7b for covering the strap attachment part 3, and the strap draw-out part 7e is disposed in a position adjacent to the strap attachment part cover 7b.

As shown in FIGS. 4(a) and 4(b), the strap attachment part 3 protrudes from the back surface of the mobile electronic device 1. Accordingly, the strap attachment part cover 7b for covering the strap attachment part 3 also protrudes from the back surface of a main body 7a of the housing protection case 7. For the strap attachment part cover 7b, a central region 7c thereof directly above the strap attachment part 3 has a smaller thickness than a peripheral region 7d thereof. Owing to such a configuration, the strength of the strap attachment part cover 7b is maintained, and the amount of the protrusion thereof is limited to a necessity minimum.

Figure 2:
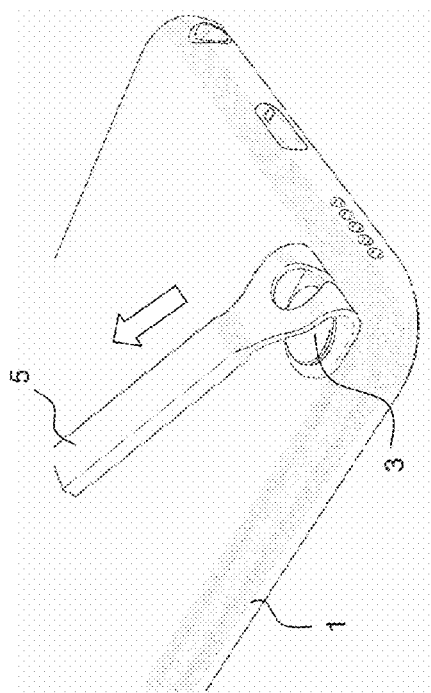
FIG. 2 is a perspective view showing a situation in which a strap is detached unintentionally.

If this housing protection case is not used or if a traditional housing protection case, which does not include the strap attachment part cover 7b, is used, when a force is applied to the strap 5 in a direction shown by an arrow in FIG. 2, the strap 5 may be unintentionally detached. On the other hand, if the housing protection case 7 of the present invention is used, the strap attachment part 3 is covered by the strap attachment part cover 7b. Accordingly, when a force is applied to the strap 5 in any direction, the strap 5 is no longer detached, which can improve user satisfaction.

Further, if this housing protection case is not used, when a force is applied to the strap 5 in a direction shown by an arrow X in FIG. 4(b), the strap 5 is slid in the direction of the arrow X, and the narrow part 5b (see FIG. 1(a)), which is adjacent to the front end of the strap 5, is detached from the base 3a of the strap attachment part 3, resulting in the detachment of the strap. On the other hand, in the housing protection case 7 of the present invention, a step 7g for blocking the slide of the strap 5 is disposed between the main body 7a and strap attachment part cover 7b. Thus, the slide of the strap 5 is blocked, so that the fit between the narrow part 5b and base 3a is stably maintained.

Figure 6:
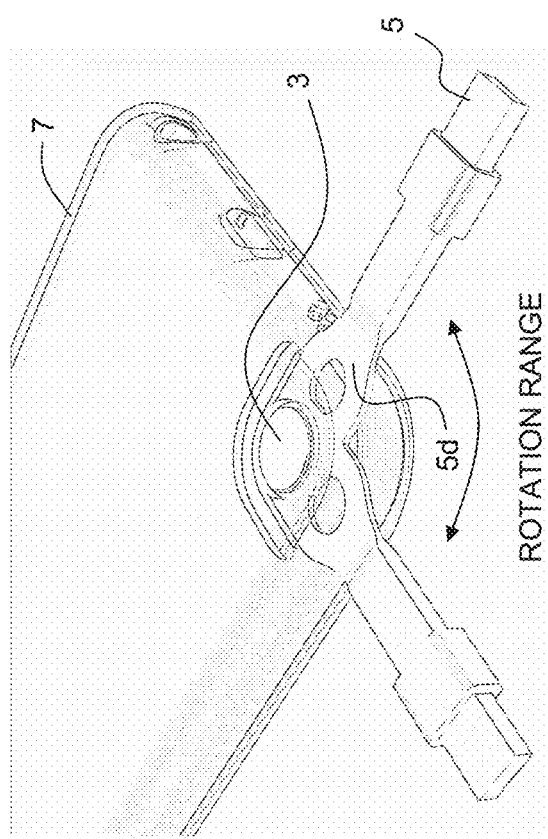
FIG. 6 is a perspective view showing the rotation range of a strap attached to a strap attachment part.

The size of the aperture of the strap draw-out part 7e is not particularly limited as long as the strap 5 can be drawn out through the aperture. However, the width in the thickness direction thereof is preferably 50 to 150%, more preferably 80 to 120% of the thickness of a thin part 5c of the strap 5. Further, the width in the circumferential direction thereof, as shown in FIG. 6, is a width such that the rotation range of the strap 5 attached to the strap attachment part 3 is preferably 45° or more, more preferably 60° or more, even more preferably 75° or more, most preferably 90°. The upper limit of the rotation range is, for example, 150°, 135°, 120°, or 105°. Such sizes allow the strap 5 to be stably held. Further, since the rotation range of the strap 5 is sufficiently wide, user satisfaction can be improved. In one example, the distance from the back and side surfaces of the mobile electronic device 1 to the center of the strap attachment part 3 is 7.42 mm, and the width of a ring 5d of the strap 5 is 9 mm.

The material of the housing protection case 7 is not particularly limited, but is preferably a hard elastic material such as polycarbonate or a soft elastic material such as silicone so that the housing protection case 7 can be elastically fitted to the mobile electronic device 1. The housing protection case 7 may be transparent, semi-transparent, or non-transparent. If the housing protection case 7 is transparent or semi-transparent, it is possible to visually recognize a logo or the like provided on the back surface of the mobile electronic device 1 to which the housing protection case 7 is attached.

Figure 7:
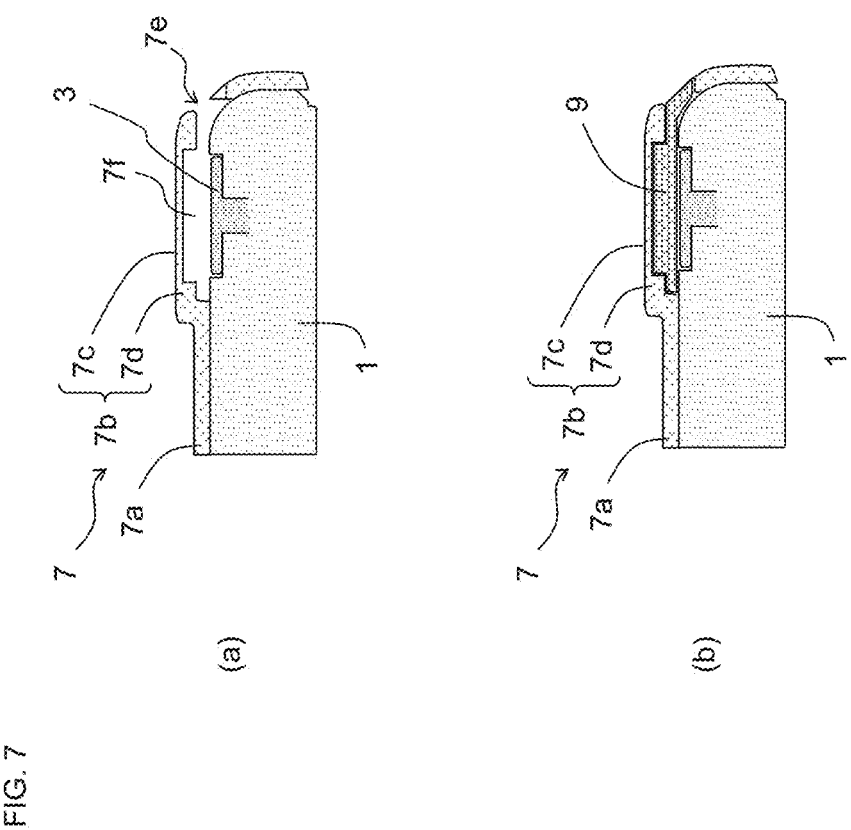
FIG. 7(a) is a sectional view corresponding to FIG. 4(b) and shows the states of a mobile electronic device and a housing protection case when no strap is used.
FIG. 7(b) is a sectional view corresponding to FIG. 4(b) and shows the state in which a strap attachment part cap is disposed in space between the mobile electronic device and strap attachment part cover.

When the strap 5 is not used, the strap attachment part 3 of the mobile electronic device 1 can be pressed into the mobile electronic device 1 so that the upper surface of the strap attachment part 3 becomes approximately flush with the back surface of the mobile electronic device 1, as shown in FIG. 7(a). In this case, when the strap attachment part 3 is pressed again, it pops up so that the strap 5 can be attached thereto, as shown in FIG. 4(b).

Figure 8:
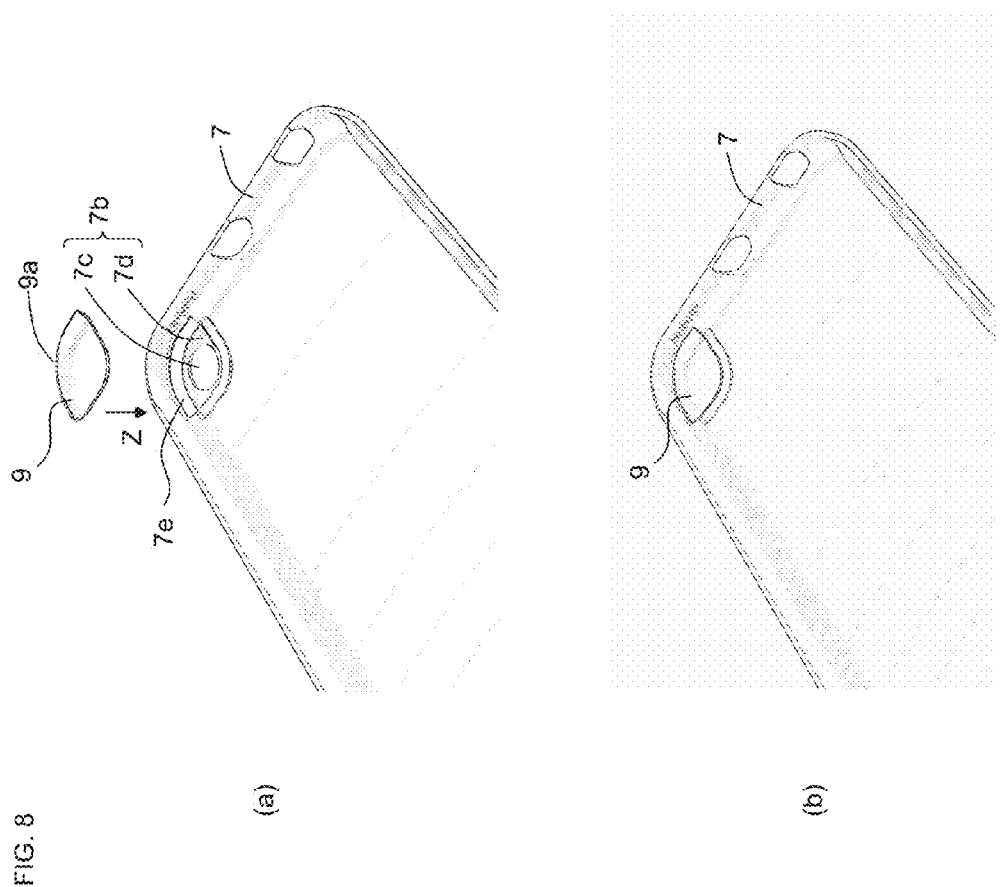
FIGS. 8(a) and 8(b) are perspective views showing an example of a method for attaching the strap attachment part cap.

In a state as shown in FIG. 7(a), dust may enter space 7f between the mobile electronic device 1 and strap attachment part cover 7b through the strap draw-out part 7e, which may reduce user satisfaction. For this reason, as shown in FIGS. 8(a) and 8(b), when the strap 5 is not used, a strap attachment part cap 9 for blocking the strap draw-out part 7e is preferably inserted into the space 7f in a direction shown by an arrow Z inside the housing protection case 7. Thus, as shown in FIG. 7(b), the strap attachment part cap 9 is held between the mobile electronic device 1 and strap attachment part cover 7b. The strap attachment part cap 9 may have any shape as long as the strap attachment part cap 9 can block the strap draw-out part 7e, but preferably has approximately the same shape as the space 7f. If so, the space 7f is filled with the strap attachment part cap 9. Thus, even when the strap attachment part cover 7b is pressed, it is no longer recessed, which improves user satisfaction. Further, the outer periphery of the cap 9 preferably has a shape such that the outer periphery is smoothly connected to the outer periphery of the housing protection case 7 in the strap draw-out part 7e when the cap 9 is attached to the housing protection case 7. Note that the cap 9 may be inserted into the space 7f through the strap draw-out part 7e with the housing protection case 7 attached to the mobile electronic device 1.

The material of the strap attachment part cap 9 is not particularly limited, but is preferably a soft elastic material such as silicone, considering the function of filling the space 7f.

DESCRIPTION OF REFERENCE SIGNS

1: mobile electronic device, 3: strap attachment part, 5: strap, 7: housing protection case, 7b: strap attachment part cover, 7e: strap draw-out part

The invention claimed is:

1. A housing protection case for covering at least a part of back and side surfaces of a mobile electronic device having a strap attachment part protruding from the back surface, the case comprising:
   a main body covering at least a part of the back and side surfaces of the mobile electronic device;
   a strap attachment part cover protruding from a back surface of the main body and covering the strap attachment part; and
   a strap draw-out part disposed in a position adjacent to the strap attachment part cover and allowing a strap attached to the strap attachment part to pass therethrough.

2. The case of claim 1, wherein a central region of the strap attachment part cover directly above the strap attachment part has a smaller thickness than a peripheral region of the strap attachment part cover.

3. The case of claim 1, wherein a step for blocking a slide of the strap is disposed between the main body and the strap attachment part cover.

4. The case of claim 1, wherein a width in a circumferential direction of the strap draw-out part is a width such that the strap attached to the strap attachment part can rotate by 45° or more.

5. The case of claim 1, further comprising a strap draw-out part cap held between the mobile electronic device and the strap attachment part cover that blocks the strap draw-out part.

6. The case of claim 5, wherein the strap draw-out part cap has approximately the same shape as space between the mobile electronic device and the strap attachment part cover.

* * * * *